United States Patent [19]

Vansant

[11] Patent Number: 4,718,678
[45] Date of Patent: Jan. 12, 1988

[54] METHOD AND ARTICLE FOR SEALING PROTECTION OF TERMINAL BLOCKS

[75] Inventor: Jan Vansant, Korbeek, Belgium

[73] Assignee: N. V. Raychem S.A., Kessel-Lo, Belgium

[21] Appl. No.: 874,252

[22] Filed: Jun. 13, 1986

[30] Foreign Application Priority Data

Jun. 13, 1985 [GB] United Kingdom ............... 8515009

[51] Int. Cl.⁴ ..................... F16J 15/14; H02G 15/04
[52] U.S. Cl. ........................................ 277/1; 277/192; 277/DIG. 6; 174/77 R
[58] Field of Search .............. 277/1, 192, 197, DIG. 6; 439/531; 174/77 R, 65 SS

[56] References Cited

U.S. PATENT DOCUMENTS

| 3,337,681 | 8/1967 | Smith | 174/77 R |
| 3,439,406 | 4/1969 | Wallin | 277/1 |
| 3,525,529 | 8/1970 | Pfeifer et al. | 277/1 |
| 3,781,456 | 12/1973 | Knowles et al. | 277/1 |

FOREIGN PATENT DOCUMENTS

| 2506604 | 8/1975 | Fed. Rep. of Germany | 174/77 R |
| 2042100 | 9/1980 | United Kingdom | 277/DIG. 6 |
| 675241 | 8/1979 | U.S.S.R. | 277/DIG. 6 |

Primary Examiner—Robert S. Ward
Attorney, Agent, or Firm—Dennis E. Kovach

[57] ABSTRACT

A method of environmentally sealing an indented surface comprises applying a sealing material, e.g. a gel to the surface, together with an elastically deformable means, e.g. a foam. The elastically deformable means is capable of maintaining the sealing material under compression, even after further displacement of the sealing material into the indentations.

17 Claims, 8 Drawing Figures

METHOD AND ARTICLE FOR SEALING PROTECTION OF TERMINAL BLOCKS

This invention relates to environmental protection of substrates, such as electrical contacts, particularly cable connecting blocks where re-entry is required.

Connections between cables, such as telephone cables, are often located where contamination and corrosion can easily occur, and it is therefore necessary that some environmental protection be provided if long-term performance is to be reliable. Where the connections between all the conductors of the joined cables are permanent (or where very rare re-entry is required) a splice case can be built up around the cable in a semi-permanent manner with the aid of, for example, high performance adhesives. In many instances, however, the way in which the conductors of one cable are joined to those of one or more other cables may be required to be altered frequently; environmental protection must then be provided by means which is easily re-enterable but which is still of high performance.

U.S. Pat. No. 3,879,575 (Bell Telephone Laboratories) discloses an enclosure for encapsulating electrical conductors which has the form of a hinged clam-shell which closes around the conductors. Each clam-shell half is filled with a low viscosity oil gelled by a block copolymer and mixed with polyethylene. The enclosure may be repeatedly re-entered simply by opening the clam-shell.

This simple arrangmenet of container and sealing material will not in general allow large numbers or high frequencies of re-entries, is unlikely to provide sufficiently uniform penetration of sealing material into interstices of a substrate having a highly indented area and may fail when subjected to temperature cycling tests. Thus, it is not suitable for protecting a cable terminal block which is subjected to temperature variations and which requires frequent re-entry.

In particular, we have found that prior art devices and methods are not suitable for protecting substrates having indented surfaces where complete filling of indentations by sealing material is not possible or desirable. We have discovered that where re-entry is desirable, it is preferable that the sealing material does not adhere (or only weakly adheres) to the surface. The problem then arises as to how to maintain encapsulation of the surface by the sealing material against the forces of intruding moisture and other contaminants. A solution is to maintain the sealing material under compression, and that solution is acceptable where the surface is completely encapsulated, i.e. where any indentations are effectively filled with sealing material. Substrates such as some cable terminal blocks have open indentations or voids which cannot therefore be filled. The simple solutions of the prior art are not then applicable.

We have discovered that improved results can be obtained if particular means is provided for maintaining the sealing material under compression, such that sufficient force is applied to resist displacement of sealing material by contaminants and such that some relaxation of the sealing material can be accomodated.

Thus, the invention provides a method of environmentally sealing an indented surface by means of an article comprising:
(a) a support;
(b) a sealing material; and
(c) a substantially elastically deformable means for maintaining the sealing material under compression;
which method comprises:
(1) applying the article to the surface such that the sealing material is displaced partially into the indentations and the means (c) is deformed; and
(2) fixing the support against substantial movement with respect to the surface;
the means (c) being capable of maintaining the sealing material under compression after step (2) and after some subsequent displacement of the sealing material further into the indentations.

A means for maintaining of the type defined allows for tolerance in the installed position of the article (particularly of the support) while retaining the required compressive force on the sealing material. This is desirable where the size and shape of the substrate, and therefore the required volume of sealing material, are uncertain. More importantly, however, some relaxation of the sealing material, i.e. a movement of the sealing material away from the support and further into the indentations, can occur with sufficient compressive force remaining exerted on the sealing material.

The force exerted by the means (c) for maintaining can therefore be chosen high enough to counteract intrusion of moisture and other contaminants, but low enough to allow for easy installation and no or limited displacement of the sealing material further into the indentations than is necessary. Some such relaxation of the sealing material may be a consequence of the required compressive force on the gel, and this is accommodated by relaxation of elastically deformed means (c). The range of allowable forces to be exerted will of course depend on the nature of the surface to be protected (particularly the size of its indentations), on the deformability of the sealing material and on the service life of the products involved. The skilled man, after reading this specification, will however be able to choose suitable values.

We prefer that the means for maintaining comprises a layer of a foam, preferably a non-impregnated foam, or other elastically compressible material. Such a foam preferably extends over an area corresponding to substantially the whole of the surface of the support (or at least that part of it which holds the sealing material) and is preferably provided between the support and the sealing material. Thus, a sandwich construction may be formed with the foam attached to the support and the sealing material attached to the foam. The foam is preferably from 5–40 mm, especially 5–20 mm in thickness. Other means for maintaining may comprise metal or plastics springs or an inflated bladder, but they are not at present preferred.

It will generally be desirable that re-entry be clean i.e. that on removal of the article from the substrate surface the sealing material comes cleanly away from the substrate and remains intact, held by the support. It is for this reason that the cohesive strength of the sealing material is high. By a high cohesive strength, therefore, we mean a cohesive strength greater than the adhesive strength of the material to the substrate (which will be determinable in practice by the skilled man who will be conversant with the limited materials that will serve as substrates in this art). The absolute value of the cohesive strength will depend on the nature of the re-entry operation and the frequency with which it is to be performed. The cohesive and adhesive strength will vary according to the rate at which one attempts to remove the sealing material from the substrate. The above consideration is to be taken at slow removal, at which cohesion is more likely to be greater than adhesion. If the sealing material is attempted to be removed quickly a layer may acceptably remain on the substrate.

Many simple materials otherwise suitable as sealing materials in this invention may be found not to have the requisite cohesive strength. They may still however be used, if they are reinforced, for example by incorporating them in a porous support, such as an open cell foam, which can reduce the bulk elongation of the material.

In general, we prefer that the sealing material comprises a gel, preferably having a cone penetration of 80–400 ($10^{-1}$ mm), particularly 100–350 ($10^{-1}$ mm), especially 150–250 ($10^{-1}$ mm), as measured by ASTM-D 217–68 on an undisturbed sample at 17° C. using a standard 1:1 scale cone (cone weight 102.5 g, shaft weigth 47.5 g), the penetration being measured after 5 seconds. The sealing material preferably has an ultimate elongation (as measured by ASTM-D638–80 at 17° C. using a type 4 die to cut the sample and at a speed of 50 cm/minute) of at least 50%, preferably at least 100% especially at least 200%, most especially at least 400%. Such a material, which is referred to herein as a gel, is particularly useful in conjunction with an open cell foam or other reinforcement as mentioned above.

The gel may be prepared by gelling a liquid mixture comprising suitable gel precursor materials, e.g. polyurethane or polysiloxane precursor materials, together with suitable reactive or non-reactive extenders. For example suitable gels can be made by gelling a mixture comprising conventional curable polyurethane precursor materials in the presence of substantial quantities of a mineral or vegetable oil or a mixture thereof (e.g. in amount 60 to 80%) or a suitable plasticizer, e.g. a trimellitate such as n-octyl-n-decyl trimellitate (e.g. in amount 30 to 70%). A suitable reactive extender for polyurethane precursors is a mixture of mineral and vegetable oils in which the ratio by weight of mineral oil to vegetable oil is 0.7 to 2.4, the mixture of oils being present in amount 80 to 60%, preferably 80 to 70%, by weight based on the total weight of the polyurethane precursor materials and the mixture of mineral and vegetable oils. The gel may contain known additives such as moisture scavengers (e.g. benzoyl chloride), antioxidants, fillers, pigments and fungicides. The encapsulant will of course preferably be electrically insulating (although there are applications where it need not be) and it preferably has a volume resistivity of at least $10^9$ ohms cm. Additionally, it will preferably be hydrolytically stable, moisture insensitive, and substantially inert towards the substrate.

The article of the invention is particularly useful for environmental sealing of cable terminal blocks such as TSR blocks used by the French PTT. Such blocks are used to join cables, especially several distribution (or drop) cables to a larger main cable, in the following way. The ingoing and outgoing cables are connected in a permanent way to respective terminal blocks (more than one block may be required for each cable), and then the respective blocks are interconnected by jumper wires. The jumper wires are connected to the blocks by means for example of screw connectors so that connections can easily be broken and remade. Thus, the way in which the ingoing and outgoing cables are connected (i.e. which conductor pairs are connected to which conductor pairs) can easily be varied by altering the configuration of jumper wires without disturbing the main and distribution cable connections.

It is the connections of these jumper wires to the terminal blocks that the apparatus of the invention is to protect, and it can be seen that re-entry will be required each time the configuration of electrical connections is to be altered.

The design of the apparatus will of course depend on the design of terminal block or other substrate to be protected. A preferred design of block may be described. A terminal block may be approximately square in plan view (this square face will often in fact be vertical in use) and of rectangular end and side elevations, its thickness being, say, one third of its other two dimensions. The upper square face carries generally fifty-six screw-type connectors in pairs in a seven-by-four grid. These screw connectors are, electrically-speaking, to be regarded as seven modules, each containing four pairs of connectors. Each block can thus accommodate twenty-eight conductor pairs, and groups of these blocks, usually two, four, or eight, will be required for cables of usual size.

These screw connectors are in electrical connection with contacts on the opposite face of the block, by means for example of connecting rods passing through the thickness of the block.

The conductors of a first cable, such as a telephone main cable, are connected, for example by soldering, to the contacts on the opposite face of one block, and the conductors of a second cable, such as a drop cable, are similarly connected to the opposite face of a second block. These connections may be regarded as permanent. The first and second cables are then connected together by means of jumper wires which run from the connectors on the top face of one block to those on the top face of the second block. In one design, the jumper wires may not in fact be fully visible from the top surface of a block since they run from the screw connectors down into channels in the body of the block and leave the block through holes, generally in its sides. Thus, the top surface of the block appears as a grid of connectors, the conductors, the insulation of which will be stripped back for electrical connection, being below the general level of that surface.

It can be seen that proper encapsulation of these connectors requires penetration of a sealing material some depth between each connector in order that the entire connector and any exposed conductor outside the connector (in practice some conductor insulation will be stripped back too far) is surrounded by the sealing material. Complete encapsulation is desirable not primarily to maintain electrical contact between conductor and connector, but to prevent moisture or other contamination leading to conductive paths between one conductor and connector and an adjacent conductor and connector. Such conductive paths result in interference and cross-talk, and are a principal cause of disruption of telephone services.

The problem faced by the present inventor was how to achieve this high level of environmental protection not only on initial installation but also after a large number of re-entries, whilst allowing for easy and clean re-entry. A simple cover over the terminal block is of course easily removeable but does not offer the desired high performance; and prior art sealing materials which may be forced around elecrical contacts do not allow re-entry and as used in the prior art cannot guarantee protection of a substrate as indented as a terminal block.

We prefer that the article of the invention includes a support which is able to be attached to a terminal block by hinging so that re-entry can be effected with the article remaining attached to the block. Furthermore, we prefer that a single action be required to close the article over the terminal block, rather than a multi-step action such as closing the apparatus to an approximately installed position and then applying pressure to displace the sealing material around the connectors. The reason for this preference is that in the first case it is clear to the workman whether or not the apparatus has been closed and there is thus little liklihood of the job being left partly undone. A snap action catch or spring mechanism is preferred. The means (c) for maintaining may be provided as part of the support or as part of some mechanism whereby it is held in a position closed with respect to the surface to be protected.

Where the terminal blocks are grouped in pairs, the article of the invention may provide cover for two blocks in the following way. A central part may be provided which is fixed between the two terminal blocks for example by sliding or by screwing or bolting in a recess between them, and two covers (which comprise the support and hold the sealing material) are independently hinged to this central part. Thus, each terminal block can be sealed and re-entered independently by a hinging action of the respective covers, and the entire apparatus can be removed from the pair of blocks by a sliding action etc. It may be desirable that the central part be installable between the blocks for example by sliding, and then as a separate step the covers be pivotally connected to said central part. This allows assembly in a confined space.

The invention is further illustrated by the accompanying drawings, in which.

Figure 1:
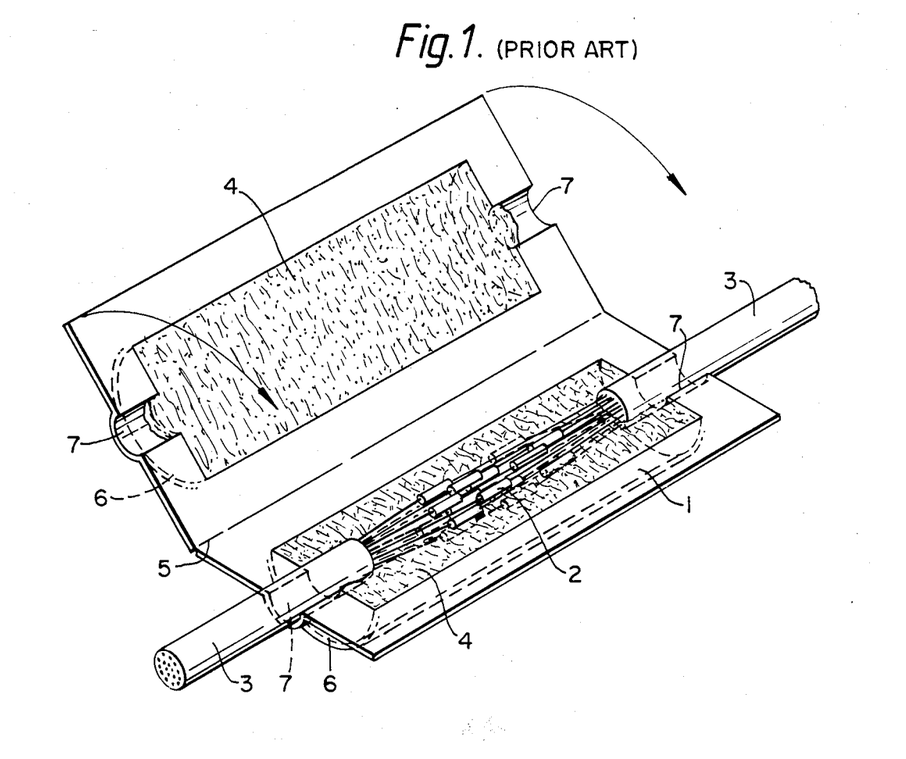
FIG. 1 shows a prior art splice case for a telecommunications cable.

FIG. 1 shows a prior art splice case 1 such as that disclosed in U.S. Pat. No. 3,879,575. Conductors 2 between cables 3 are environmentally protected by encapsulation within a sealing material 4 held in clam-shell halves hinged together at 5. The clam-shell halves are formed with central reservoirs 6 which hold the bulk of the sealing material 4 and with outlets 7 in which the cables 3 lie. The clam-shell halves are closed as indicated by the arrows to seal the conductors 2.

Figure 2:
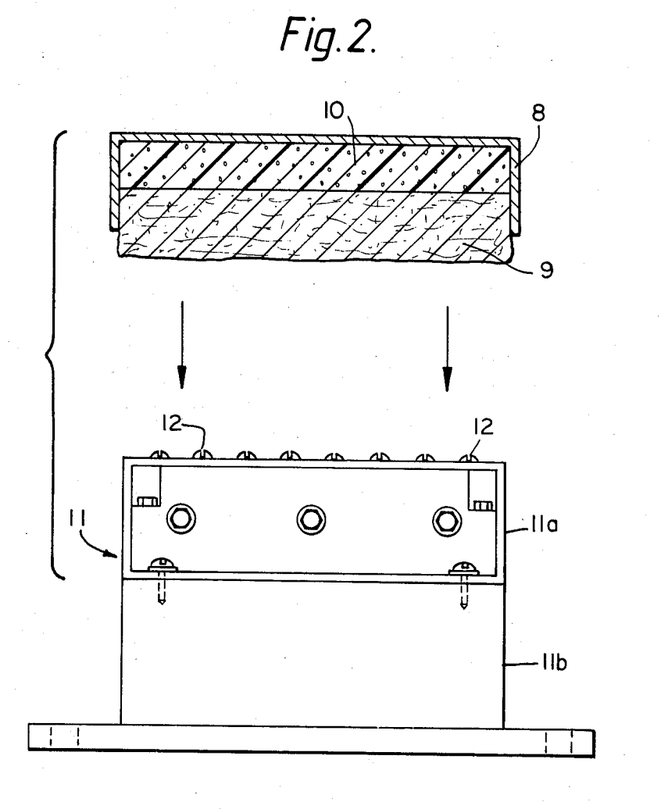
FIG. 2 shows the article of the invention, together with a terminal block.

An article according to the invention is shown in FIG. 2, positioned above a terminal block 11 comprising an indented top part 11a and a base 11b. The article of the invention comprises a support 8, a sealing material 9 and a means 10 for maintaining the sealing material under compression. The support may directly hold the sealing material, or it may hold it indirectly, for example through some other member such as the means 10. In the illustrated embodiment the sealing material is held by the support 8 mainly by its being attached to the means 10 and the means 10 being attached to support 8. In some instances, where at least part of the means 10 has a certain mechanical strength the support and means 10 may be provided by a single article.

The sealing material is preferably a gel, especially a preferred gel as indicated above. The gel may be attached to the means 10 or to a support directly, by any suitable means. Attachment may rely simply on adhesion between the sealing material and the support or means 10 (the support or means 10 may be roughened or shaped to increase adhesion), or may involve a grafting reaction, or may involve bonding between a reinforcement of the sealing material (such as a foam matrix within which some substance is held) and the support or means 10.

We prefer that the sealing material comprises a gel-impregnated open cell foam, and that the means 10 comprises a non-impregnated foam. A single piece of foam may be used, only part of which is impregnated. It may however be desirable that the compression characteristics of the means 10 and of the sealing material be different such that different types of foams are preferably used in the two halves. Alternative solutions here would be to use a single piece of foam and to treat one half of it to alter its physical properties, or to use a density gradient foam which is a single piece of foam whose density varies throughout its thickness.

Where two pieces of foam are to be used it may be desirable to join them together (for example by bonding with an adhesive) before impregnation of the gel. The foam may be impregnated first with gel precursors which are then cured in situ.

The foam used as the means 10 preferably has one or more of the following: a density of from 10–230, more preferably 15–200, Kg/m$^3$; a compression resistance of 2–100, more preferably 5–60 KPa at a value from 25–50% compression; an ultimate elongation of 100–250%, more preferably 150–200%; and a tensile strength of 50–1200, more preferably 100–800 KPa. Suitable foams are pre-compressed foams produced by compression and high temperature fixing.

The foam used as the reinforcement of the sealing material 9 preferably has one or more of the following: a density of from 15–40, more preferably 20–35 Kg/m$^3$; a compression resistance of 2–5, more preferably 2.5–3.5 KPa at 40% compression; an ultimate elongation of at least 150%, preferably at least 200%, especially from 200–400%; and a tensile strength of at least 100, more preferably at least 150, especially from 150–300 KPa.

In general, we prefer that the foam of means 10 has a compression resistance of from 50–100%, preferably 75–90%, especially 80–85% of that of the foam reinforcement when impregnated with the sealing material. Where some means other than a foam is used as means 10, these figures apply with the proviso simply that a deformation analogous to the compression of a foam should be considered.

The relative resistances to compression (or other deformation) allows the article to be forced against a substrate such that the sealing material is forced into any indentations or crevices in the substrate with the means 10 compressed to a significant extent. Thus, relaxation of the sealing material (or slight movement of the support away from the substrate) can be accomodated by expansion or other relaxation of the means 10 preferably whilst retaining a substantially unaltered compressive force on the sealing material.

The substrate to be environmentally protected in FIG. 2 is a terminal block 11, the top part 11a of which carries connectors 12 which are subject to corrossion and shorting. The article of the invention fits over the top part of block 11, and the application of a force in the direction of the arrows causes means 10 to become compressed and then (due to its higher compression resistance) the foam part of material 9 becomes compressed, displacing a gel or other substance around the connectors 12.

Figure 3A:
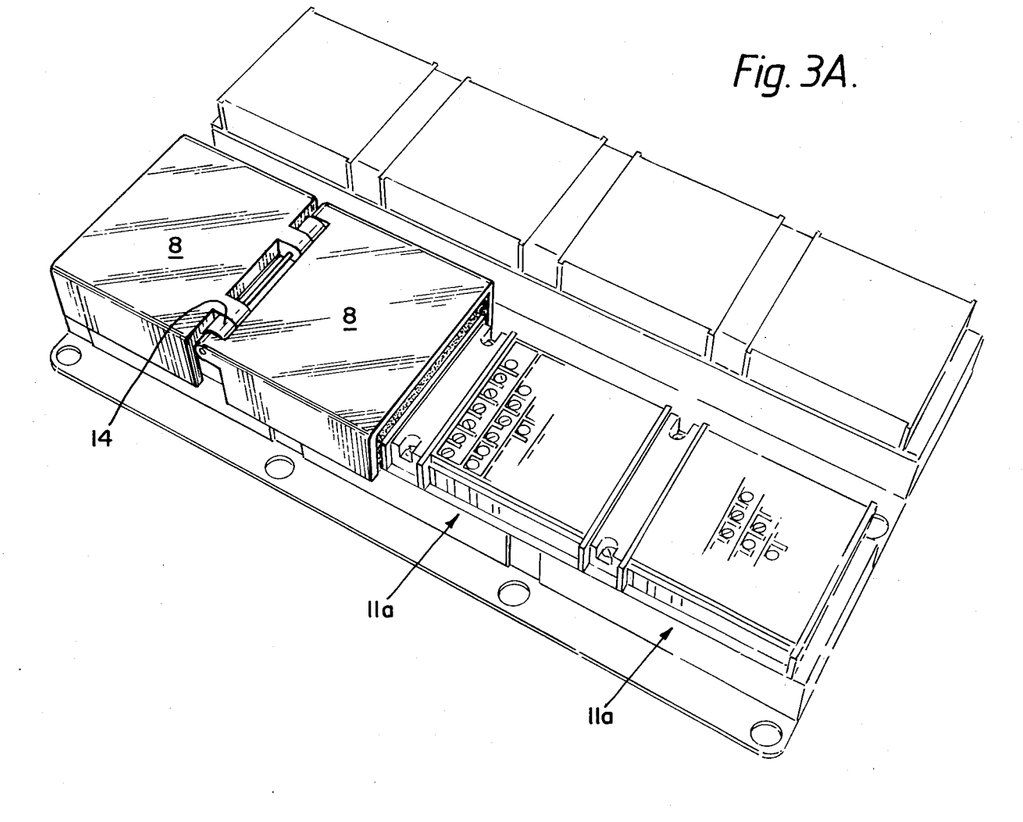
FIGS. 3A and 3B show series of terminal blocks with an article of the invention hinged thereto.
Figure 3B:
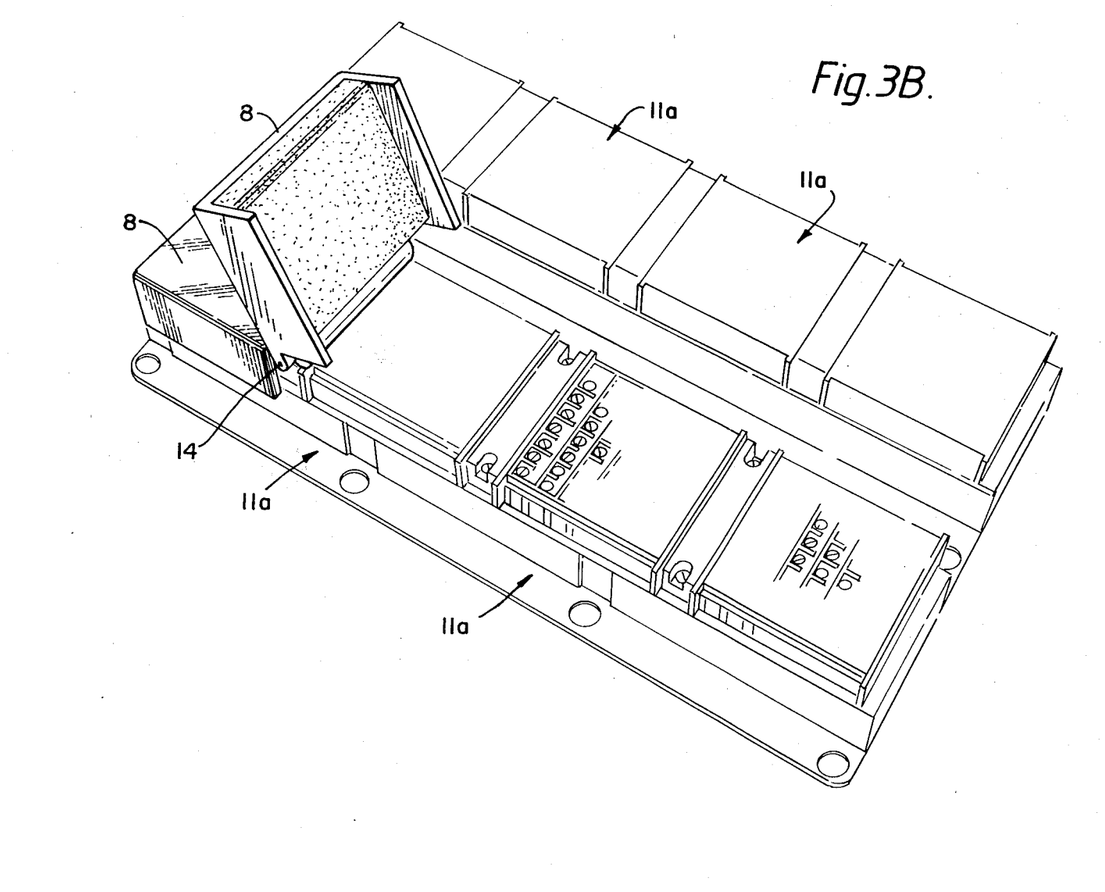

The article of the invention shown in FIG. 2 is designed to cover a single terminal block. We prefer however that two covers or other parts be pivotally connected together such that a single article may cover two blocks. This is illustrated in FIGS. 3A and 3B. FIG. 3A shows the two covers in position over two blocks; in FIG. 3B one of the covers has been pivoted upwards independently of the other to expose one of the blocks.

Figure 4A:
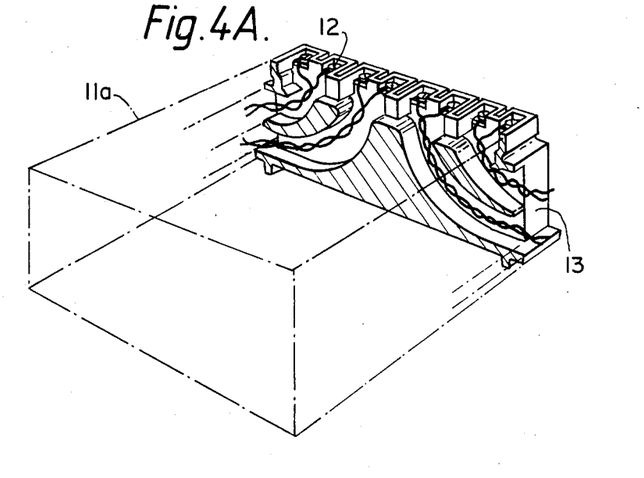
FIGS. 4A and 4B show terminal blocks in greater detail.
Figure 4B:
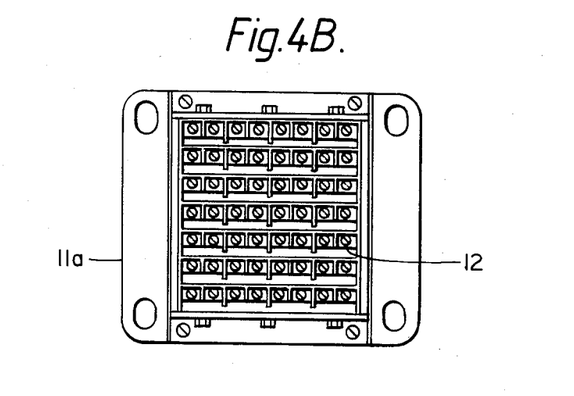

A top part 11a of a terminal block is shown in more detail in FIG. 4A, which is an internal perspective view, and FIG. 4B which is a plan view. The peramanent connections to the main or distribution cable to be terminated at the terminal block are not shown (such connections would be made to the base 11B of the article shown in FIG. 2 in electrical contact to connectors 12 through vertical rods set in the material of block 11a). The wires 13 are jumper wires used to connect one terminal block to another. It is clear from FIG. 4A that the sealing material of the article of the invention must penetrate some distance into the indentations if the connectors 12 and any exposed stripped ends of conductors 13 are to be encapsulated. It is also clear that it is not practical to fill the indentations with sealing material, particularly if re-entry is required.

Figure 5A:
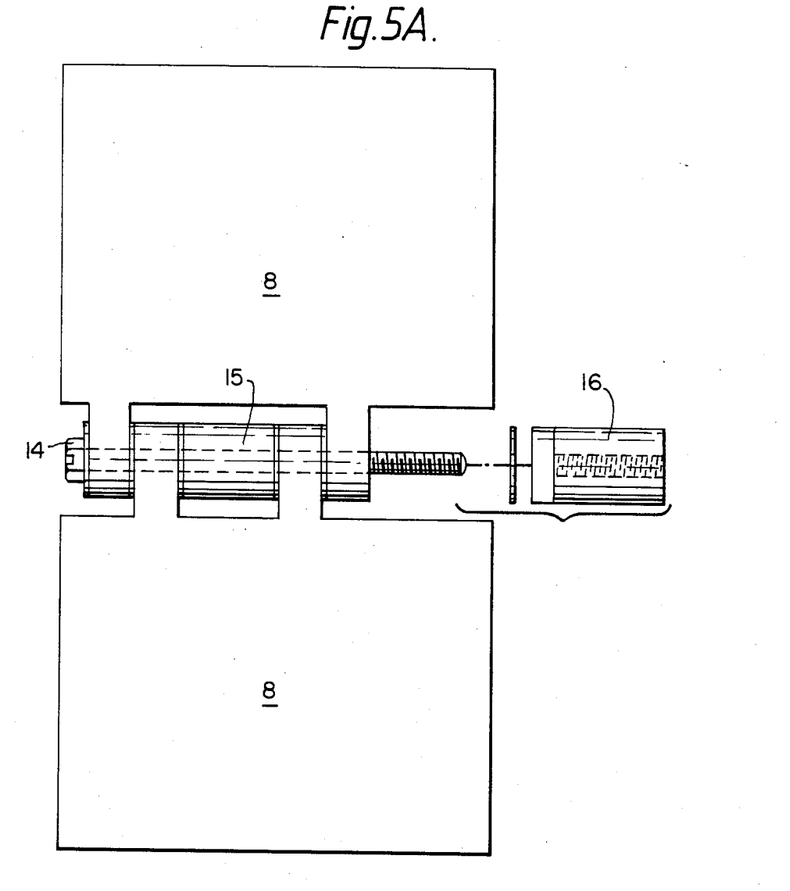
FIGS. 5A and 5B show a way in which the article of the invention can be hinged to a terminal block.
Figure 5B:
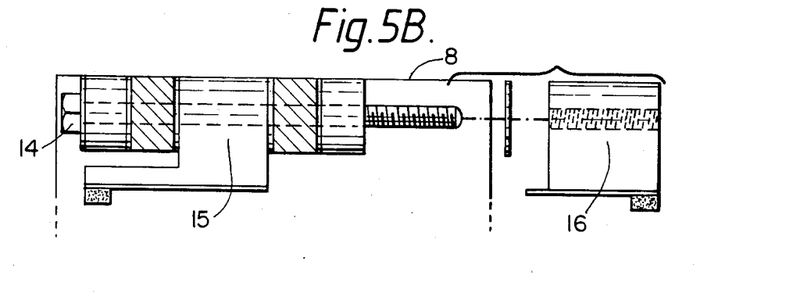

FIG. 5A is a plan view of a support 8 in the form of a hinged cover for covering two terminal blocks such as those shown in FIG. 3. FIG. 5B is a cross-section through the hinge 14. Parts 15 and 16 are to be fixed between the two terminal blocks to be protected. After parts 15 and 16 are positioned, preferably by sliding, the hinge 14 and the nut 16 are installed. This method of installation requires less lateral space than a method whereby a complete twin cover is installed.

I claim:

1. A method of environmentally sealing an indented surface by means of an article comprising:
   (a) a support;
   (b) a sealing material; and
   (c) a substantially elastically deformable means for maintaining the sealing material under compression;
   which method comprises:
   (1) applying the article to the surface such that the sealing material is displaced partially into the indentations and the means (c) is deformed; and
   (2) fixing the support against substantial movement with respect to the surface;
   the means (c) being capable of maintaining the sealing material under compression after step (2) and after some subsequent displacement of the sealing material further into the indentations.

2. A method according to claim 1, in which the sealing material comprises a gel.

3. A method according to claim 1, in which the sealing material has a cone penetration of 80–400 ($10^{-1}$ mm) and an ultimate elongation of at least 200%.

4. A method according to claim 1, in which the sealing material is reinforced.

5. A method according to claim 4, in which the sealing material comprises an impregnated foam.

6. A method according to claim 5, in which the sealing material comprises a foam impregnated with a gel.

7. A method according to claim 5, in which the foam of the sealing material has a compression resistance of 2–5 KPa at 40% compression.

8. A method according to claim 6, in which the foam of the sealing material has a compression resistance of 2–5 KPa at 40% compression.

9. A method according to claim 1, in which the means for maintaining comprises a foam.

10. A method according to claim 9, in which the means for maintaining comprises an open cell foam.

11. A method according to claim 9, in which the foam of the means for maintaining has a compression resistance of 5–60 KPa at a value from 25–50% compression.

12. A method according to claim 10, in which the foam of the means for maintaining has a compression resistance of 5–60 KPa at a value from 25–50% compression.

13. A method according to claim 1, in which the means for maintaining comprises a foam and the sealing material comprises an impregnated foam; the compression resistance of the first-mentioned foam being 75–90% of that of the impregnated foam, each value being measured at 40% compression.

14. A method according to claim 1, suitable for environmentally protecting a terminal block.

15. A method according to claim 14, suitable for environmentally protecting at least two terminal blocks, and comprising two parts pivotally connected to each other, each part being able to cover one block and being able to be pivotally moved to expose that block independently of the other part.

16. An article for environmentally sealing an indented surface, which comprises:
   (a) a support;
   (b) a sealing material reinforced to reduce its bulk elongation; and
   (c) a substantially elastically deformable means for maintaining the sealing material under compression after some displacement of the sealing material.

17. An article for environmentally protecting a terminal block, which comprises:
   a support having a cover;
   a non-impregnated foam fixed to the cover; and
   a gel-impregnated foam attached to the non-impregnated foam and having a surface that faces away from the cover.

* * * * *